Nov. 28, 1961 H. WEHOF ET AL 3,011,080
PHOTOELECTRIC GENERATORS
Filed April 28, 1959 2 Sheets-Sheet 1
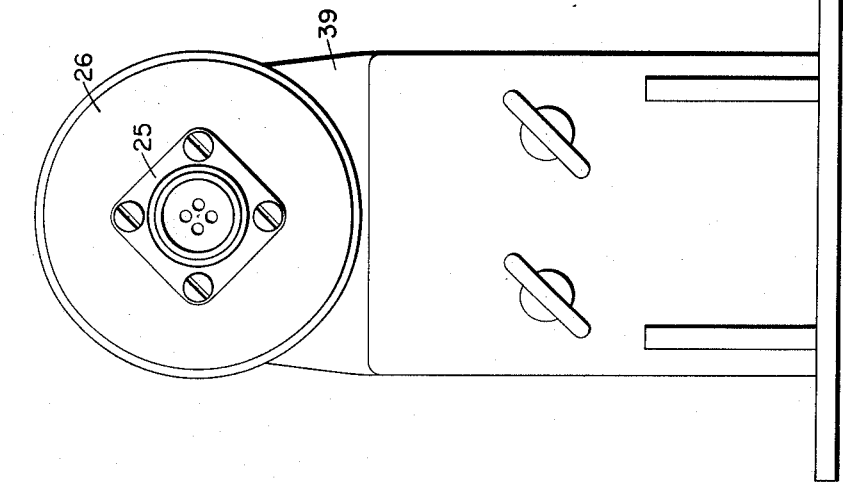
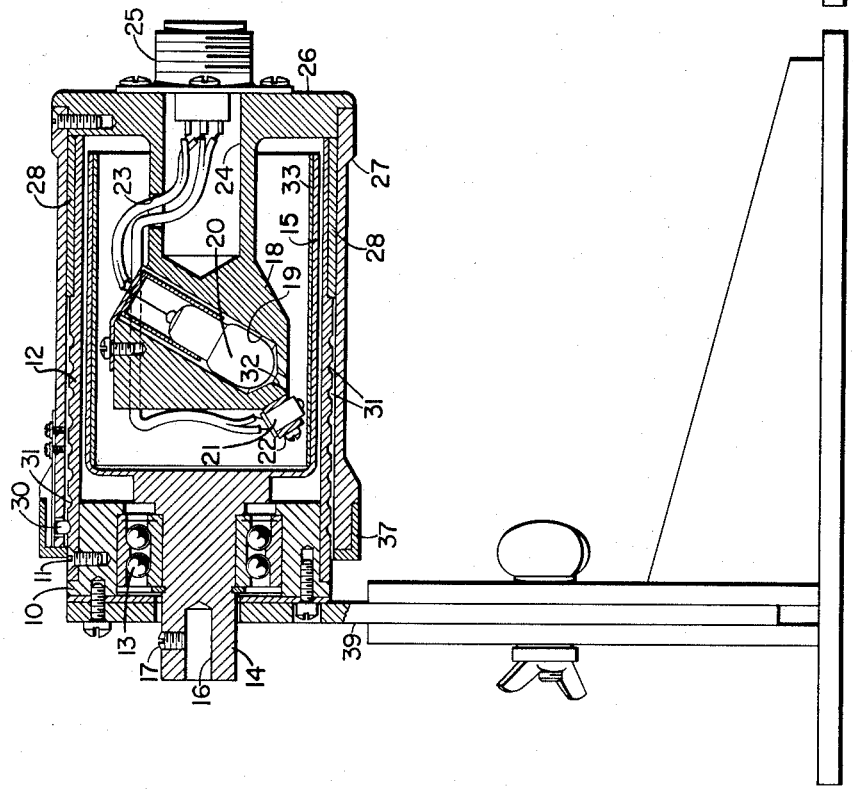
INVENTORS
Hubert Wehof
BY Nicholas N. White
Marshall J. Breen
ATTORNEY Nov. 28, 1961 H. WEHOF ET AL 3,011,080
PHOTOELECTRIC GENERATORS
Filed April 28, 1959 2 Sheets-Sheet 2

INVENTORS
Hubert Wehof
BY Nicholas N. White
*Marshall J. Breen*
ATTORNEY

United States Patent Office 3,011,080
Patented Nov. 28, 1961

3,011,080
PHOTOELECTRIC GENERATORS
Hubert Wehof, North Plainfield, and Nicholas N. White, Somerville, N.J., assignors to The Singer Manufacturing Company, Elizabeth, N.J., a corporation of New Jersey
Filed Apr. 28, 1959, Ser. No. 809,537
4 Claims. (Cl. 310—2)

This invention relates to a rotary photoelectric generator and more particularly to a generator which produces a single pulse output for each revolution of the rotor and in which the pulse width and phase position are selectively adjustable.

In the field of automatic control it becomes necessary to produce periodic pulses accurately related to phase position in an operating cycle to provide precise synchronization of mechanical motion with control of electrical circuits. It is desirable that such a device have fast response and be free of cam and switch wear, slip rings and contact bounce. It is further necessary that the width of the pulse generated be selectively adjustable and that the phase position of the pulse in the revolution cycle be precisely and continuously selectable.

As an example of the use to which such a generator may be put, reference may be made to the United States patent application Serial No. 809,538, filed April 28, 1959 wherein a generator of this type is used to provide a train of gating pulses for connecting a transducer to an indicating device for preselected periods in an operating cycle in order to isolate and study the variation in some physical quantity at various points in the cycle.

It is an object of this invention therefore to provide a pulse generator capable of producing a train of sharp pulses which may be quickly and easily adjusted as to width and phase position and without the use of cams, make and break devices or sliding contacts.

This has been accomplished according to the present invention by employing a photo-transistor, a light source and a rotary beam interrupting device. The beam interrupting device is the variable reflecting surface of a stainless steel shim insert placed within a cylindrical cup and which is rotated relatively to a stationary light source.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby, will be readily understood by those skilled in the art.

FIG. 1 is a longitudinal sectional view taken through a device embodying the invention.

FIG. 2 is a right-hand end elevational view of the device of FIG. 1.

Figure 4:
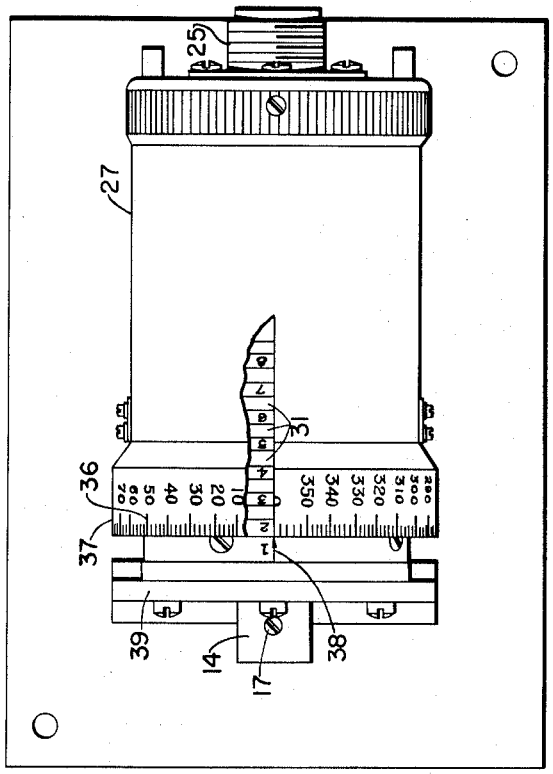
FIG. 4 is a top plan view of the device of FIG. 1.

Referring to FIG. 1 the stator element comprises a bearing support 10 to which is secured by screws 11 a cylindrical sleeve 12. Secured within the support 10 is a double ball-bearing 13 in which is journaled a rotor having a hub portion 14 and a cylindrical cup portion 15. The hub portion is formed with a recess 16 and a transverse tapped hole for taking a set screw 17 and provides for external connection with a shaft for driving the rotor.

Located within the cylindrical cup portion 15 is a lamp support 18 having a recess 19 within which is secured a small incandescent lamp bulb 20. A photo-transistor 21 is secured to said lamp support 18 by means of a clamp 22. The photo-transistor actually used in this device is a TI–800 Germanium unit commercially available from Texas Instruments, Incorporated, Dallas Texas. This unit has very fast response and produces a pulse having a short rise time which is desirable for accurate gating. Recesses 23 and 24 provide access for electrical conductors from the lamp bulb 20 and from the photo-transistor 21 to a connector 25 for connection with external circuits as desired. The lamp support 18 is formed with an annular flanged end 26 to which is secured a cylindrical sleeve 27 which is free to rotate and to slide frictionally with respect to the sleeve 12. A friction spacer sleeve 28 is interposed between sleeves 12 and 27 and provides a dust seal for the interior.

Spring-pressed detents 30 cooperate with longitudinally spaced annular surface grooves 31 made in the sleeve 12 to provide several discrete longitudinal positions of sleeve 27 relative to sleeve 12 for purposes hereinafter described.

Located on the axis of the lamp bulb 20 is an aperture 32 made in the lamp support 18 which permits a pencil of light from the bulb to impinge on the surface of a thin, flat stainless shim 33 sprung to conform to and to fit within the cylindrical cup portion 15 of the rotor. Light reflected from the shim surface falls onto the photo-transistor 21 which emits a sharp voltage pulse of time duration equal to the time of illumination.

Figure 5:
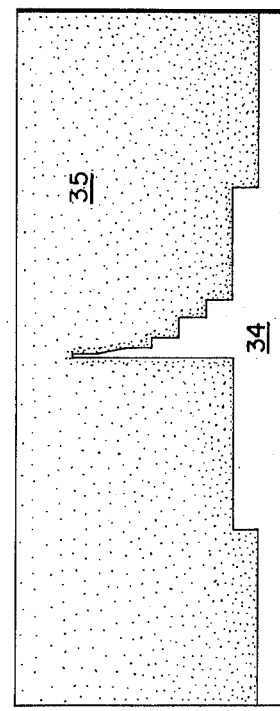
FIG. 5 is a plan view of the variable reflector element used in the device of FIG. 1.
Figure 3:
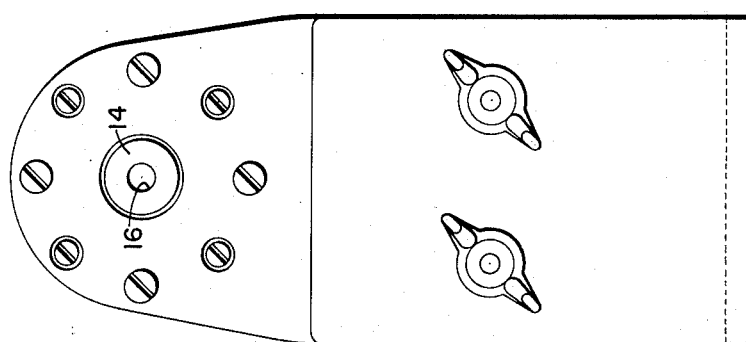
FIG. 3 is a left-hand end elevational view of the device of FIG. 1.

As seen in FIG. 5, the unsprung shim 33 provides a variable reflecting pattern having an area 34 polished to permit good reflection and an area 35 having a flat black finish to prevent reflection. It will be seen that when the shim is fitted within the cup portion 15, the polished area 34 comprises a series of stepped circumferential segments of varying angular size, each segment corresponding to a specific detent position of sleeve 27 relative to sleeve 12. Thus, by manually adjusting the relative longitudinal position of sleeves 12 and 27, any predetermined segment angle on shim 33 may be selected for reflection and this determines the width of the pulse generated.

Further, angular rotation of the sleeve 27 relative to the sleeve 12 moves the light source relatively to the reflecting segment on the shim 33 and thus varies the phase position of the pulse generated in each cycle. The angular segments provided by the shim of FIG. 5 are 360°, 180°, 30°, 20°, 10°, 5°, 3°, and 1°, but it is clear that any desired pattern could be used, and since the shim is easily removable, this adapts the device to a variety of reflecting patterns as desired.

To enable the phase position to be read, a scale 36, calibrated in angular degrees, is marked out on an annular ring 37 secured to the sleeve 27 as seen in FIG. 2. A zero reference mark or index 38 is marked on the stator sleeve 12.

In use, a stationary bracket 39 is secured to and supports the bearing support 10, and the rotor is coupled to the shaft of the machine to be tested, input and output connections being made through the connector 25. Simple manual rotation and translation of the sleeve 27 provides all the necessary variations in the output pulse.

While the photo-responsive device 21 has been shown here preferably as a photo-transistor, it is to be understood that this element may be any conventional photocell which responds to the quantity of light falling upon it.

It will be observed from the above that all electrical connections are made directly and not through make and break or sliding contacts, and that no cams or switches are used. The device is thus rugged and wear in the parts is reduced to a minimum.

Having thus described the nature of the invention, what we claim herein is:

1. A photo-electric generator for producing voltage pulses, comprising a rotating cylindrical cup, reflecting means on the interior surface of said cup, a relatively stationary support located within said cup, a light source and a photo-responsive element mounted in fixed relative position on said support in such a relation that light from said light source is reflected by said reflecting means to impinge on said photo-responsive element, means for altering the reflecting means to obtain reflection over a variable portion of the circumference of the interior surface of said cup, and means for producing limited rotational adjustment of the stationary support.

2. A rotary photo-electric pulse generator comprising a stator, a light source and a photo-transistor mounted on said stator, a rotatable cylindrical cup surrounding said light source and said photo-transistor, a reflecting element insertable within and rotatable with said cup to reflect light from said source to said photo-transistor, said reflecting element having longitudinally adjacent bands of different circumferential extent, and means for selecting any one of said bands for effecting light transmission between the source and the photo-transistor.

3. A photo-electric pulse generator comprising a first stationary cup member, a second cup member positioned in sliding telescopic relation with said first cup member and having a central portion projecting within said cup, a light source and a photo-transistor mounted on said projecting portion, a cylindrical cup-like rotor journaled in said first stationary cup member and positioned to contain therewithin the light source and the photo-transistor, a reflecting element insertable within and rotatable with said rotor for reflecting light from said source to said photo-transistor, said reflecting element carrying a predetermined pattern of reflecting and nonreflecting portions, and means for selecting a desired portion of said pattern for effective light transmission between said source and said photo-transistor.

4. A photo-electric pulse generator comprising a stationary support, a cup-like rotor journaled in said support, a cylindrical sleeve member frictionally supported on said support for limited endwise translation and angular rotation relative thereto, said sleeve member being formed with a central supporting boss which reaches within the rotor, a light source and a photo-transistor mounted in fixed relation on said supporting boss, a reflecting element insertable within and rotatable with said rotor and formed with longitudinally adjacent reflecting bands of different circumferential extent, detent means for selecting a specific band for reflecting light from said source to said photo-transistor and means for rotating said cylindrical sleeve member through a predetermined angle relative to said stationary support.

References Cited in the file of this patent
UNITED STATES PATENTS 1,816,047    Keuffel _____ July 28, 1931